United States Patent [19]

Hovakimian

[11] Patent Number: 5,466,919

[45] Date of Patent: Nov. 14, 1995

[54] CREDIT/CHARGE CARD SYSTEM ENABLING PURCHASERS TO CONTRIBUTE TO SELECTED CHARITIES

[76] Inventor: Henry Hovakimian, 9635 La Cima Dr., Whittier, Calif. 90603

[21] Appl. No.: 202,735

[22] Filed: Feb. 28, 1994

Related U.S. Application Data

[63] Continuation-in-part of Ser. No. 19,412, Apr. 2, 1993, abandoned.

[51] Int. Cl.$^6$ .................................................. G06K 5/00
[52] U.S. Cl. ........................... 235/380; 902/022; 364/406
[58] Field of Search ...................................... 364/401, 402, 364/406, 408; 235/380, 385; 902/4, 22

[56] References Cited

U.S. PATENT DOCUMENTS

| | | | |
|---|---|---|---|
| 5,025,372 | 6/1991 | Burton et al. | 364/408 X |
| 5,223,699 | 6/1993 | Flynn et al. | 235/380 |
| 5,285,384 | 2/1994 | Gineris | 364/408 |
| 5,287,268 | 2/1994 | McCarthy | 364/408 X |

FOREIGN PATENT DOCUMENTS 0361989  4/1990  European Pat. Off. ............... 235/385

Primary Examiner—Donald T. Hajeo
Assistant Examiner—Jeffrey R. Filipek
Attorney, Agent, or Firm—Monty Koslover Assoc.

[57] ABSTRACT

A method which enables a credit cardholder to make a donation to a cardholder-selected charity any time he makes a purchase using the credit card. The method comprises a credit/charge card which identifies on its magnetic strip, charities to receive a donation, and a bank expedited system which processes the card user's purchase transaction, pays a previously decided amount to the charity or charities and also bills the cardholder. In this system, the donated amounts may be paid by the bank or card issuing organization, or the cardholder may add an amount which he pays to the selected charity. The proposed system may be described as being a bank expedited charity donation, (abbreviated to BAX) approach for credit/charge cardholders.

4 Claims, 2 Drawing Sheets

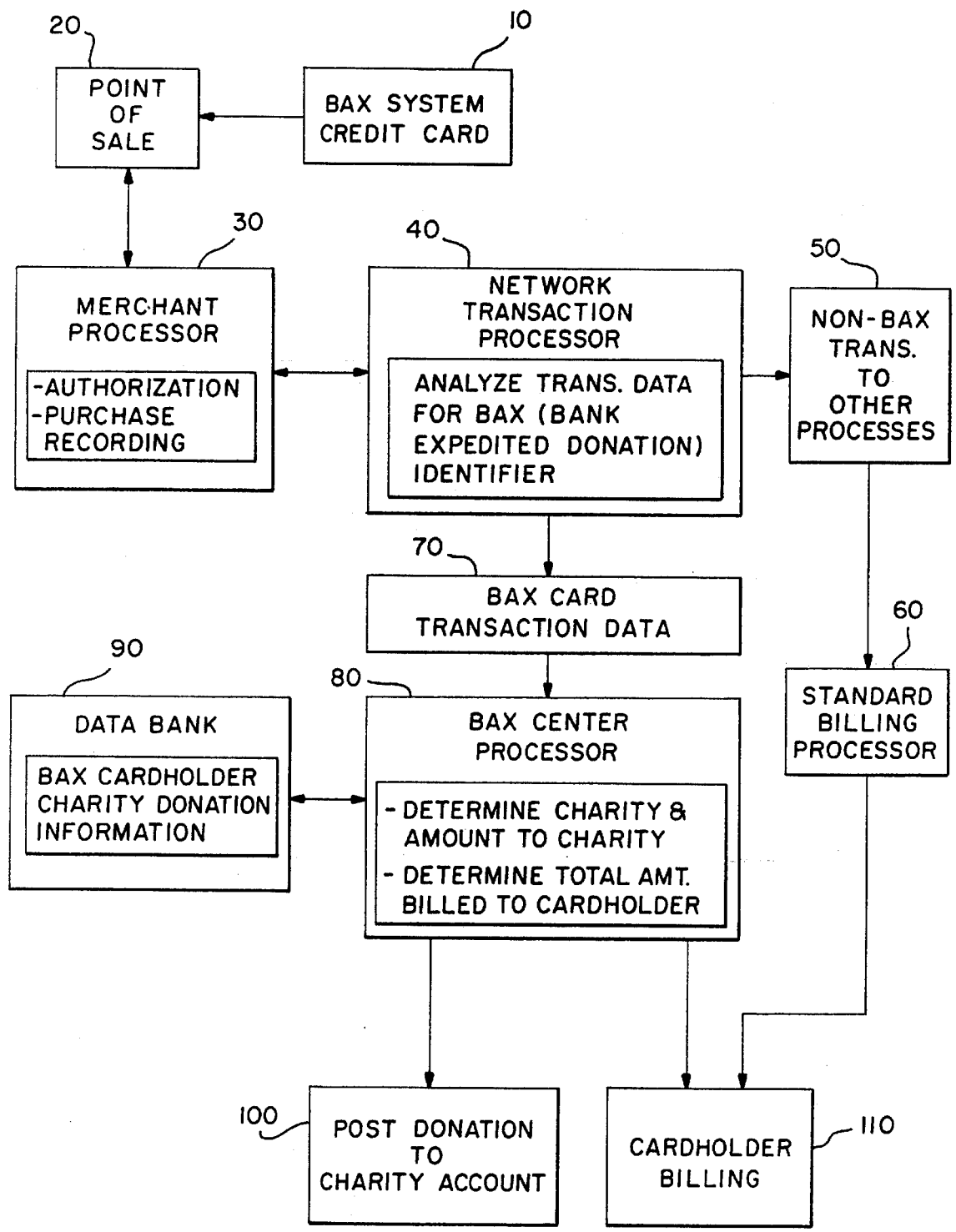

CREDIT/CHARGE CARD SYSTEM ENABLING PURCHASERS TO CONTRIBUTE TO SELECTED CHARITIES

This is a continuation-in-part of application Ser. No. 08/019,412 filed on Apr. 02, 1993 now abandoned.

BACKGROUND AND SUMMARY OF THE INVENTION

This invention relates to a bank system for using credit/charge cards for making purchases and recording and billing, and more particularly to a system enabling credit/charge cardholders to contribute to charities of their choice.

At the present time, several banks offer credit/charge cards where the user benefits in some manner every time a transaction using the card is made. The user benefit may be 'Air flight miles' or cash toward a new car, vacation or a gift. These benefits are promoted by the banks or card issuing organizations as an incentive for the purchaser to use their credit card. The credit cardholder has no part in deciding where the benefits should go, only to receive them.

Considering the daily pleas being heard for donations to charities of all kinds, it would be new and useful if such donations and contributions could be made to a charity selected by a cardholder using a credit/charge card. As an option, the cardholder could also request a donation (paid by the cardholder) to the United States Government for a reduction of the national debt. At present, there exists no known mechanism or credit/charge card system for making the above cardholder contributions.

The invention comprises a credit/charge card which identifies a charity or charities to receive a donation, and a purchase processing system which processes the card user's transaction, pays a previously decided amount to the charity or charities and also bills the cardholder. In this system, the donated amounts may be paid by the bank or card issuing organization, or the cardholder may add an amount which he pays to the selected charity. The proposed system may be described as being a bank expedited charity donation, (abbreviated to BAX) approach for credit/charge cardholders.

It is therefore a prime object of this invention to provide a system that enables a credit/charge cardholder to make automatic contributions to a charity of his choice with every purchase of goods or services, using a bank-expedited method of donation.

Another object is to provide a system which could generate much self-satisfaction in an individual cardholder knowing that he could help others or help reduce the national debt simply by using a participating credit/charge card.

BRIEF DESCRIPTION OF THE DRAWINGS

FIG. 3 is a block diagram flow chart, illustrating the purchase processing method for payment of donations and cardholder billing in accordance with the present invention.

DESCRIPTION OF THE PREFERRED EMBODIMENT

The invention is a system whereby a credit cardholder may make an automatic contribution to a selected charity or charities every time he or she makes a purchase of goods or services using the credit card. This would require a bank-expedited approach to identifying and paying the contribution to the given charity or charities. As such, assuming a willingness of credit card issuing organizations and banks to cooperate, there are only two things necessary for this system to work. These are a credit card which identifies the selected charity or charities, and a transaction processing method which enables the bank to pay the proper amount to a designated charity as well as including the normal cardholder billing.

Figure 1:
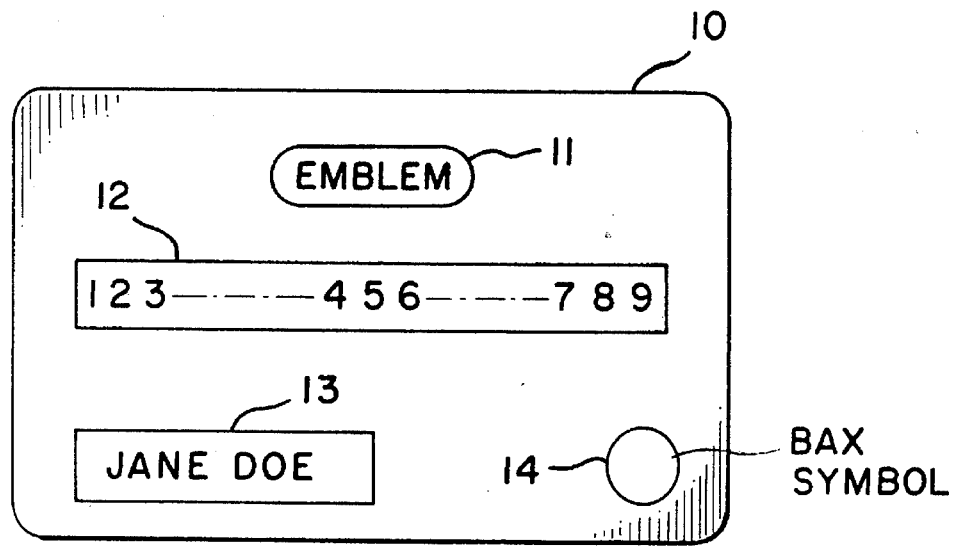
FIG. 1 is a diagram illustrating the front of a typical credit card of the present invention, particularly showing a bank-expedited donation (BAX) symbol location.
Figure 2:
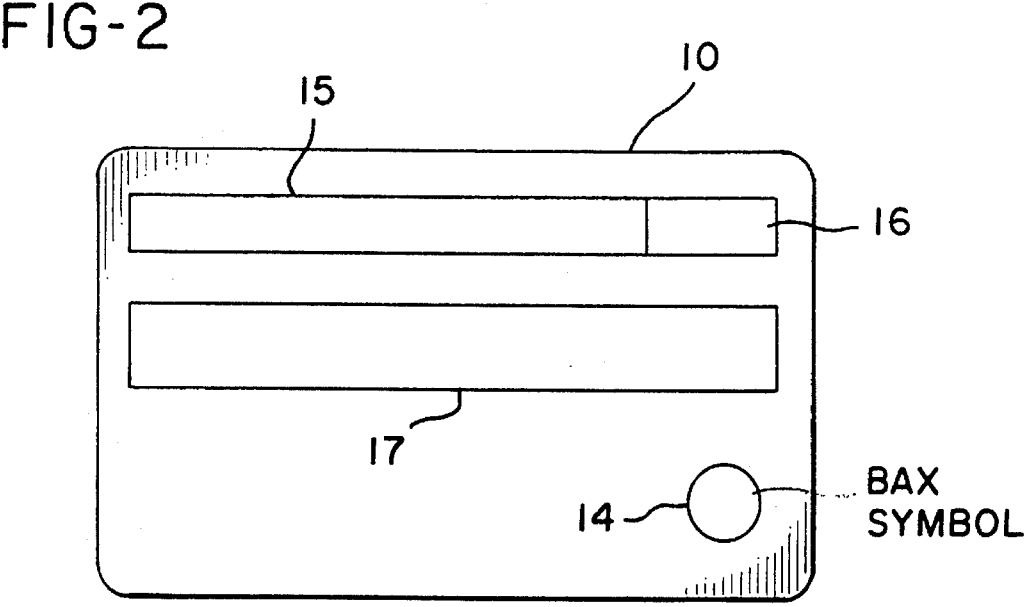
FIG. 2 is a diagram illustrating the back of a typical credit card of the present invention, particularly showing a magnetic strip location which contains a portion for account identification and a portion for identification of a charity or charities selected by the cardholder.

Refer now to FIGS. 1 and 2 which illustrate the front and back of a credit card 10 according to the present invention. As is customary with credit cards, the front face of the card 10 includes an emblem 11 or trade name associated with the card issuing organization, an account number 12 assigned by the issuer to the cardholder, and the cardholder name 13. In addition to the above items, it is proposed to put a BAX (Bank Expedited Donation) symbol 14 on both sides of the card. The BAX symbol reminds the credit cardholder as well as it apprises the merchant at the point of sale, of the particular use of the card to make a donation to charity. The symbol 14 itself can be any one assigned by the card issuer; for example, an illustrated "helping hand". Or it can simply read "BAX", which may be taken to represent a Bank Expedited donation capability.

On the back side of the card 10, there are usually located a magnetic strip 15 containing magnetically encoded account identification, and a separate non-magnetic strip for the cardholder signature 17. It is proposed to add to the magnetic strip 15, magnetically encoded alpha numeric data 16 indicating a selected charity to receive a donation. It is not imperative that the added alpha numeric 'charity ID' data be placed at one end of the magnetic strip. The data may be placed at any location along the strip determined as convenient for the card reader equipment.

When any person applies for a BAX credit/charge card offered by a card issuing organization, in addition to the standard information usually required by the organization, tile applicant will be expected to indicate a recipient charity or charities for donations made by the card issuing organization. The applicant can also specify contributions that he or she will make to the charity in addition to those lade by the card issuing organization. These applicant contributions will be added to the cardholder billings. In this way for example, a cardholder may choose to contribute a small percentage of his purchase price to the U.S. Government to help reduce the national debt. Other beneficiaries such as the Red Cross Earthquake relief fund will come to mind. Of course, at any time, a cardholder would be able to stop, change or add to his additional contributions by so informing the card issuing organization.

Referring now to FIG. 3, there is shown a block diagram of the transaction processing method proposed according to the present invention. The processing method is as follows:

Initially, an alphanumeric data charity identifier is assigned to an authorized cardholder's credit card and is magnetically encoded on a data track on the magnetic stripe located on the card back surface. The card is also identified by a symbol as being a BAX (Bank Expedited Donation) system card.

The cardholder presents his card 10 at the point of sale 20 to a cashier when making a purchase. The presently established goods and services networks include a series of merchant point of sale terminals 20 located at sites where holders of credit cards may seek to obtain goods or services. At each such site, when a transaction is made, electronic information descriptive thereof including such information as the amounts involved, the identity of the merchant, as well as the information contained on the card magnetic stripe such as the BAX code, are processed by a merchant processor 30 and communicated to a card-issuing organization network transaction processor 40.

The network transaction processor 40 analyzes the received purchase data for the presence of a BAX identifier. This BAX identifier could be the charity alphanumeric code which is on the card, or it could be a separate identifier. Non-BAX card transactions are directed to other processes 50, where they go to a billing processor 60 commonly used by card issuing organizations. Identified BAX card transaction data 70 are directed to a BAX center processor 80 which is a special processor dedicated to transactions involving charity donations.

The BAX center processor 80 interrogates a data bank 90 which contains BAX cardholder charity information, and using the received data, determines the charity account to be credited and the amount to be contributed. It also determines the total amount to be billed to the cardholder. In the event that a cardholder elects to contribute an extra amount himself to a given charity or benefit such as the U.S. Government, this amount would be added to the purchase transaction total and be identified as such. The BAX center processor then posts the donation(s) to the elected charity account or accounts 100 and also issues a cardholder billing 110.

An observation of FIG. 3 shows that, in addition to the alphanumeric magnetic donor data on a credit card, only a simple separate parallel process for a BAX transaction needs to be added to the presently established process. An incorporation of the proposed system into the regular established processing method would likely be relatively inexpensive and is believed to be quite practical.

Offsetting the costs of incorporating the proposed BAX system, the card issuing organization would undoubtedly reap greater card sales because of the card donor capability being offered to consumers.

There are many variations and possible expansions of the proposed BAX system as described above. These expansions would be decided by the card issuing organizations. For example, a BAX center customer data bank might accept input donor information data from an authorized cardholder who wishes to change his original donor instructions. Readouts of amounts donated to charities in their name could be given to cardholders on their request or at periodic intervals. Approved charities could be added to the lists of charities at the discretion of the card issuing organization.

The chief advantage of the present invention method of people making donations is that it represents a great stimulus for ordinary people to be able to help a charitable organization and/or our government, while being at the same time, an automatic and simple approach to making donations. Shortage of charitable funds will be greatly eased by use of the method. The philosophy behind this credit card idea and method is to generate a source of revenue for charitable organizations and/or our government. This will indeed help our country and our people.

While the present invention has been described herein by the preferred embodiment, it will be understood by those skilled in the art that various changes may be made and added to the process. These changes and alternatives are considered to be within the spirit and scope of the present invention.

Having described the invention, what is claimed is:

1. A method of billing for use of a credit card-issuing organization, which enables an authorized cardholder to make a contribution to a charity of his choice when making a purchase using a credit card, the method comprising the steps of:

(a) assigning to said authorized cardholder, a charity code of alphanumeric combination which identifies said authorized cardholder as having previously selected a charity or charities for donations, providing said credit card-issuing organization with cardholder files which list said charity or charities under said charity code; said charity code being magnetically encoded in track data on a magnetic stripe affixed to one side of said credit card;

(b) storing charity information obtained from said cardholder files, including said charity code, in a database so that the charities listed in said cardholder files can be accessed and identified;

(c) purchasing goods or services for said cardholder using said credit card;

(d) scanning said credit card at a point-of-sale terminal for credit card authorization data and entering purchase transaction data in a merchant processor;

(e) communicating said card authorization and purchase transaction data to a card-issuing organization network transaction processor;

(f) analyzing said card authorization and purchase transaction data by said network transaction processor for presence of said charity code, and transmitting transaction data including a charity code to a special processor dedicated to transactions involving donations;

(g) interrogating said data base and using said charity code to identify a charity account of said cardholder to be credited, an amount to be contributed to said selected charity or charities, and total amounts to be billed to said cardholder;

(h) posting a contribution amount to said selected charity account or accounts; and (i) billing said cardholder for the amount authorized at the time of the purchase transaction plus any amounts for donations made specifically by said cardholder.

2. The method defined in claim 1, wherein said method further includes:

analyzing said card authorization and purchase transaction data by said network transaction processor for presence of said charity code;

transmitting analyzed card and purchase transaction data not having a charity code to a billing processor for regular billing;

billing said cardholder for the amount authorized at the time of the purchase transaction.

3. The method defined in claim 1, further including in step (g), interrogating said data base to determine whether said cardholder wishes to make a personal donation to a given charity or to the U.S. Government, and determining the amount to be so credited.

4. The method defined in claim 1, wherein said magnetic track data on said magnetic stripe includes an authorization code which is assigned to said cardholder.

* * * * *